(12) United States Patent
VanDuyn

(10) Patent No.: US 7,097,413 B2
(45) Date of Patent: Aug. 29, 2006

(54) BEARING SUPPORT

(75) Inventor: Keven G. VanDuyn, Bloomfield, CT (US)

(73) Assignee: United Technologies Corporation, Hartford, CT (US)

( * ) Notice: Subject to any disclaimer, the term of this patent is extended or adjusted under 35 U.S.C. 154(b) by 280 days.

(21) Appl. No.: 10/843,923

(22) Filed: May 12, 2004

(65) Prior Publication Data
US 2005/0254945 A1 Nov. 17, 2005

(51) Int. Cl.
*F01B 25/16* (2006.01)
(52) U.S. Cl. .................. 415/9; 415/142; 415/170.1; 415/229; 416/2
(58) Field of Classification Search ............. 415/9, 415/229, 270.1, 173.7, 174.4, 142; 416/2, 416/244 A
See application file for complete search history.

(56) References Cited

U.S. PATENT DOCUMENTS

| 4,289,360 A | 9/1981 | Zirin |
| 5,791,789 A | 8/1998 | Van Duyn et al. |
| 5,974,782 A | 11/1999 | Gerez |
| 6,331,078 B1 | 12/2001 | Van Duyn |
| 6,409,469 B1 * | 6/2002 | Tse ........................ 415/119 |
| 6,428,269 B1 | 8/2002 | Boratgis et al. |
| 6,447,248 B1 * | 9/2002 | Kastl et al. ................ 415/9 |
| 6,494,032 B1 * | 12/2002 | Udall et al. ................ 415/9 |

* cited by examiner

*Primary Examiner*—Edward K. Look
*Assistant Examiner*—Igor Kershteyn
(74) *Attorney, Agent, or Firm*—Bachman & LaPointe, P.C.

(57) ABSTRACT

To further isolate imbalances in a rotating structure such as a gas turbine engine, an effective length between two bearings may exceed an actual length. This may be achieved via one or more tapering bearing supports associated with at least one of the bearings.

12 Claims, 3 Drawing Sheets

BEARING SUPPORT

BACKGROUND OF THE INVENTION (1) Field of the Invention

This invention relates to bearings, and more particularly to bearing supports in turbomachinery.

(2) Description of the Related Art

The use of bearings to support relatively rotating turbomachine structures is a well developed art. In common turbomachine applications, a series of coaxial bearing systems support one or more rotating structures (rotors) for normal rotation about the common axis relative to a stationary structure (stator). The bearing systems are subject to normal and abnormal loading. Normal loading may include various static forces and routine dynamic forces including vibration and transient forces associated with changes in operating condition. Abnormal loads may include those associated with damage, including foreign object damage (FOD) to any of the various rotating blades of the fan, compressor section(s), and turbine section(s). One particularly severe source of abnormal loading in a turbofan engine is a fan blade-out or blade-off (FBO) event wherein an entire blade or substantial portion of its airfoil is shed, thereby imbalancing the associated rotor. The FBO condition displaces the fan center of gravity away from the location of the shed blade and, off the engine centerline. Continued rotation of the fan about the centerline with such displacement provides a forcing function which may excite one or more modes of oscillation of the rotor. At below resonance rotation speeds, the imbalance produces a local compression on adjacent bearings generally in-phase with the displaced center of gravity. Approaching resonance, there is an angle of lag between the compression force and the rotation of the center of gravity. At resonance, this angle is about 90°. Well above resonance (e.g. in excessive twice the resonance frequency) the angle of lag approaches 180°. Notwithstanding that the engine speed and resonant frequency of a particular mode may not be exactly equal, the resonance forces may be extreme when the ratio of rotational frequency to natural frequency is in a broad range of from between 0.5:1 to nearly 2:1.

Typically, after a FBO event, an operator will not attempt to extract further power from the engine. The engine will, however, need to be configured to survive at least a partial spooldown. In non-aircraft turbomachines (e.g., power plant turbines) the engine only need typically survive a spooldown to a complete stop. In typical aircraft applications, such a spooldown is not practical as a stopped engine constitutes and extreme source of aerodynamic drag. Such drag is particularly significant in twin-engine aircraft wherein the engines are mounted in wing nacelles. This is a common construction for many passenger aircraft. Thus, in such twin-engine aircraft, the combination of drag from the stopped engine and thrust from the remaining engine will produce an excessive yawing moment not easily overcome by the aircraft rudder. Accordingly, the damaged engine is advantageously allowed to rotate, driven by the airflow resulting from the forward velocity of the aircraft in a process called "windmilling". A windmilling engine has significantly less aerodynamic drag than does a completely stopped engine.

Under the Extended Range Twin-Engine Operations (ETOPS) rating system, certain aircraft may be required to operate with a windmilling engine for a period of up to 180 minutes. The potentially damaging imbalance forces are transmitted from the windmilling rotor through the bearings to the support frame. To remain windmilling, the engine must resist damage such as bearing seizure for at least the rated ETOPS period. The engine is also preferably configured to avoid catastrophic damage to the support frame which might permit the engine to detach from the aircraft or damage the wing. One approach is to make the bearings and support frame strong enough to withstand the initial imbalance forces until the engine can be safely shut down and allowed to achieve its windmilling speed. Unfortunately, such strengthening of the bearings and support frame adds undesirable weight and bulk to the engine and aircraft.

One possible way to minimize the weight and bulk of the bearings and support frame and also protect the bearings from seizure is to support the rotor on the frame with a support arrangement having a capability to radially constrain the rotor which is abruptly relaxed (or completely defeated) upon being subjected to a radial force in excess of a predetermined value. Once the radial constraint capability is relaxed, the rotor is free to rotate about a rotational axis passing through, or at least closer to its displaced center of gravity. As a result, the transmission of imbalance forces to the support frame is minimized so that its weight and bulk can be correspondingly reduced. In practice, this is achieved by fusibly mounting the bearing which is proximate to the engine fan. When the radial force transmitted through the bearing exceeds a threshold, the bearing at least radially decouples from either the rotor or the support frame thereby reducing the resistance to local radial displacement of the rotor from the engine axis at least within a broadened range. For example, fusing (release) of the rotor support system could allow radial excursions of up to an inch while, prior to fusing, radial movement is constrained to well under $\frac{1}{10}$ inch with respect to the engine axis. A wide variety of structures may accomplish this goal. By way of non-limiting example, fusibly mounted bearings are commonly seen on engines such as the PW6000 of Pratt & Whitney, the PW305 of Pratt & Whitney Canada Inc., and the TRENT 500 of Rolls-Royce plc. Other configurations are also possible such as that shown in U.S. Pat. No. 5,791,789, the disclosure of which is incorporated by reference herein in its entirety.

Immediately upon occurrence of the FBO event, the engine is turning at an initial operating speed (for example, at its cruise speed), which is in the vicinity of but typically lower than key natural frequencies of the engine as described above (namely the "fan bounce" frequency). In the absence of fusing of the rotor support system, the rotor would go through a spool-down process before entering a steady state condition wherein the phase angle between the imbalance forces and the rotor deflection would be nearly zero as the engine speed decayed from the cruise speed to the windmilling speed. However, the imbalance forces at the beginning of spool-down may be excessive given the relatively high initial speed (e.g., a cruise speed of 2000–2500 rpm) since such forces are proportional to the square of the speed.

As noted above, it is known to utilize fusible rotor support systems to prevent imbalance forces from being transmitted to the support structure. Accordingly, there is provided a fusible mount/support (hereinafter "bearing support") coupling the bearing to either the shaft or the non-rotating support structure. The threshold strength of the fusible bearing support may be set to fuse (release) during the initial transient response. Upon release, the natural frequency of the supported rotor drops dramatically. For example, it may drop to somewhere between about $\frac{1}{5}$ and $\frac{1}{2}$ of the rotor's initial natural frequency. Thus, upon release, there will be a second transient response as the rotor transitions from conditions associated with the initial natural frequency to those associated with the reduced natural frequency. At the beginning of that second transient response, the ratio of engine speed to the reduced natural frequency is well over 2:1 (a condition associated with a phase angle between the imbalance forces and the deflection of approximately 180°). During the second transient, the engine spools down to a cruise windmilling engine speed (e.g., about 700 rpm). Subsequently as the aircraft slows for landing, the windmilling speed will similarly slow (for example, to around 300 rpm). During either of these spooldown stages the rotor may go through the reduced natural frequency (wherein the phase angle is 90°) and achieve a phase angle close to zero. The engine is still subject to significant radial displacement of the rotor and associated flexing of the shaft.

At the reduced natural frequency, the imbalance forces even near resonance may be tolerable if the engine is robustly constructed and if prolonged operation near resonance is avoided. The imbalance forces and displacements during the various transitions and thereafter may still subject the engine and aircraft to excessive loading and undue sympathetic vibration.

There remains room for further improvement in the engineering of engines and their bearing systems.

BRIEF SUMMARY OF THE INVENTION

One aspect of the invention involves a turbine engine wherein a number of bearing systems couple a first spool to a support structure. A first bearing system has an inner race coupled to a shaft of the first spool and an outer race coupled to the support structure. A second bearing system, aft of the first bearing system, has an inner race coupled to the shaft of the first spool and an outer race coupled to the support structure. The first spool shaft has a main body portion and a forwardly diverging web. The web has a proximal root at the main body portion and a distal portion holding the second bearing system inner race.

In various implementations, an engine case duct portion of the support structure is coupled to the outer races of the first and second bearing systems by a forwardly and inwardly-extending structure. Such structure may have an aft portion coupling the outer race of the second bearing system to the engine case duct portion and a fore portion fusibly coupling the outer race of the first bearing system to the aft portion. The aft portion may couple the outer race of the second bearing system to the engine duct portion by a rearwardly converging web having a proximal root at the aft body portion and a distal portion holding the second bearing system outer race. The first bearing system may be a frontmost bearing system and the second bearing system may be a next aft bearing system. The forwardly diverging web may essentially be a frustoconical sleeve and may be unitarily formed with the main body portion of the shaft. The web may provide an effective post-fusing cantilever length in excess of an actual length between the first and second bearing systems. The effective post-fusing cantilever length may be in excess of 110% of the actual length.

Another aspect of the invention involves a turbine engine having a number of bearing systems coupling a first of a high and low spool to a non-rotating structure. A first of the bearing systems has an inner race coupled to a shaft of the first spool and an outer race coupled to the non-rotating structure by a fusible coupling. A second bearing system, aft of the first bearing system by a first length, has an outer race coupled to the non-rotating structure and an inner race coupled to the shaft of the first spool by means for providing a post-fusing effective cantilever length of the first bearing system relative to the second bearing system in excess of the first length.

In various implementations, the first spool shaft may have a main body portion. The means may comprise a forwardly diverging web having a proximal root at the main body portion and a distal portion holding the second bearing system inner race. The first spool may be the low spool. The low spool may be directly coupled to the non-rotating structure by the first and second bearing systems. The engine may be a turbofan engine.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
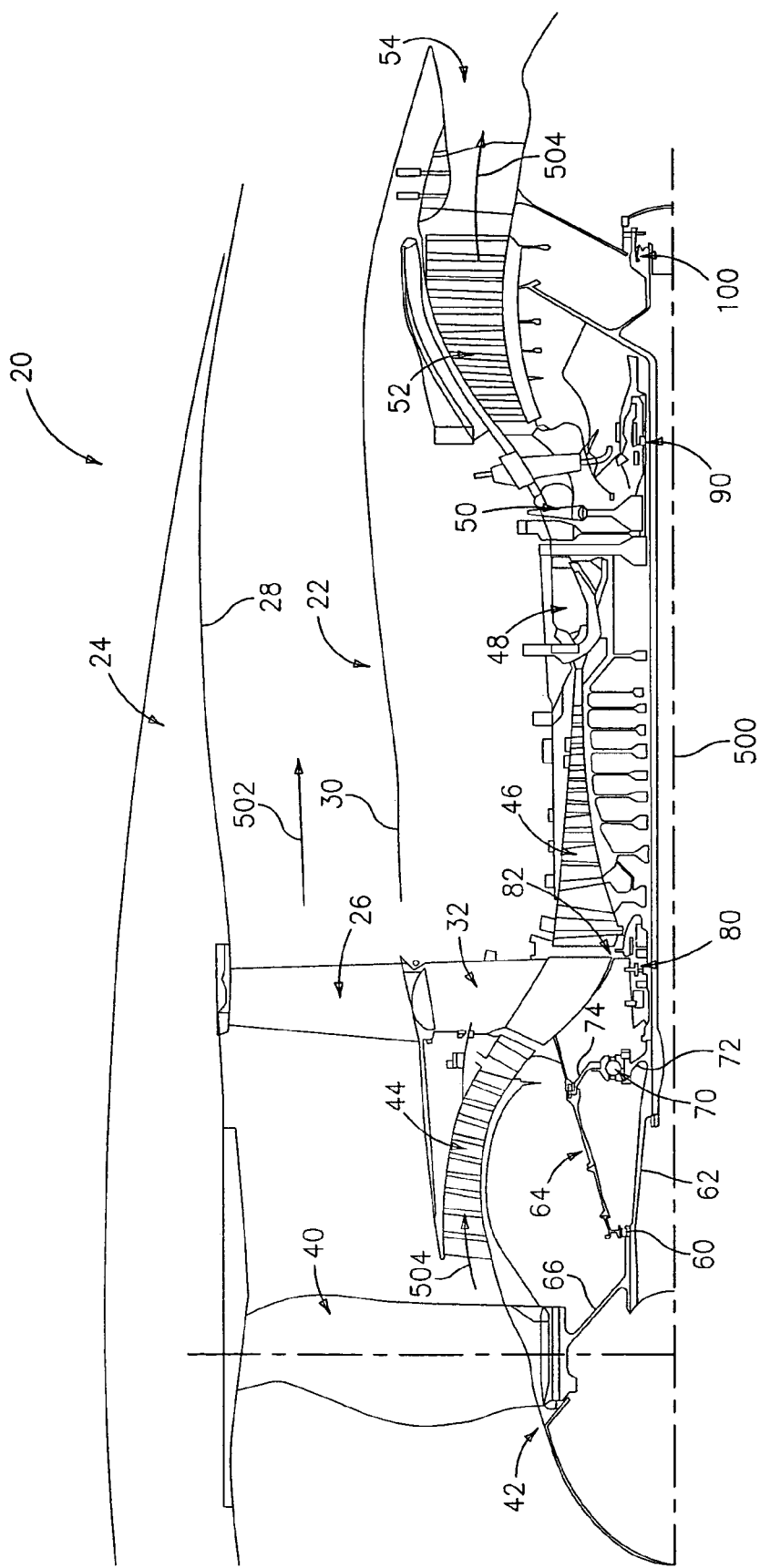
FIG. 1 is a partially schematic half longitudinal sectional view of a turbine engine according to principles of the invention.

FIG. 1 shows an exemplary turbofan engine 20 having a central longitudinal axis or engine centerline 500. The engine includes a core 22 mounted within a nacelle 24 with a generally annular bypass flowpath 502 therebetween. The core is supported relative to the nacelle by a circumferential array of struts 26 extending between a nacelle inner surface 28 and a core outer surface 30. The struts 26 are supported on a strut hub 32 of a core non-rotating engine case structure.

The bypass flowpath 502 extends downstream from a fan having a number of blades 40 on a hub 42. In the exemplary embodiment, the fan is mounted on the low speed spool of a two-spool system. Downstream from the fan along the core flowpath 504 is a low speed/pressure compressor section 44 whose blades are on the low speed spool. Further downstream is a high speed/pressure compressor section 46 whose blades are on the high speed spool. Further downstream is a combustor 48. Further downstream is a high speed/pressure turbine section 50 whose blades are on the high speed spool. Yet further downstream is a low speed/pressure turbine section 52 whose blades are on the low speed spool. An engine exhaust nozzle 54 may be further downstream.

An exemplary engine has several bearing systems for rotatably supporting one or both of the shafts directly or indirectly relative to the non-rotating engine case. The exemplary embodiment shows five bearing sets supporting the low speed spool. Of these, a frontmost number one bearing 60 is positioned between the low speed spool shaft assembly 62 and a forward end of an engine case assembly 64 extending forward and inward from the strut hub 32 inboard of the core flowpath 504. In the exemplary embodiment, the number one bearing system is aft of a support web (fan hub web) 66 of the fan hub 42 coupling the fan to the low speed spool shaft 62. The exemplary number two bearing system 70 has an inboard support 72 extending forward and outward from the low speed shaft 62 and an outboard support 74 extending aft and inward from the case 64. The number three bearing system 80 is positioned ahead of an inboard end of a number three bearing support 82 along the aft end of the strut hub 32. The number four bearing system 90 is positioned inboard of an aft high pressure turbine case element. The number five bearing system 100 is positioned inboard of an aft low pressure turbine case element.

Figure 2:
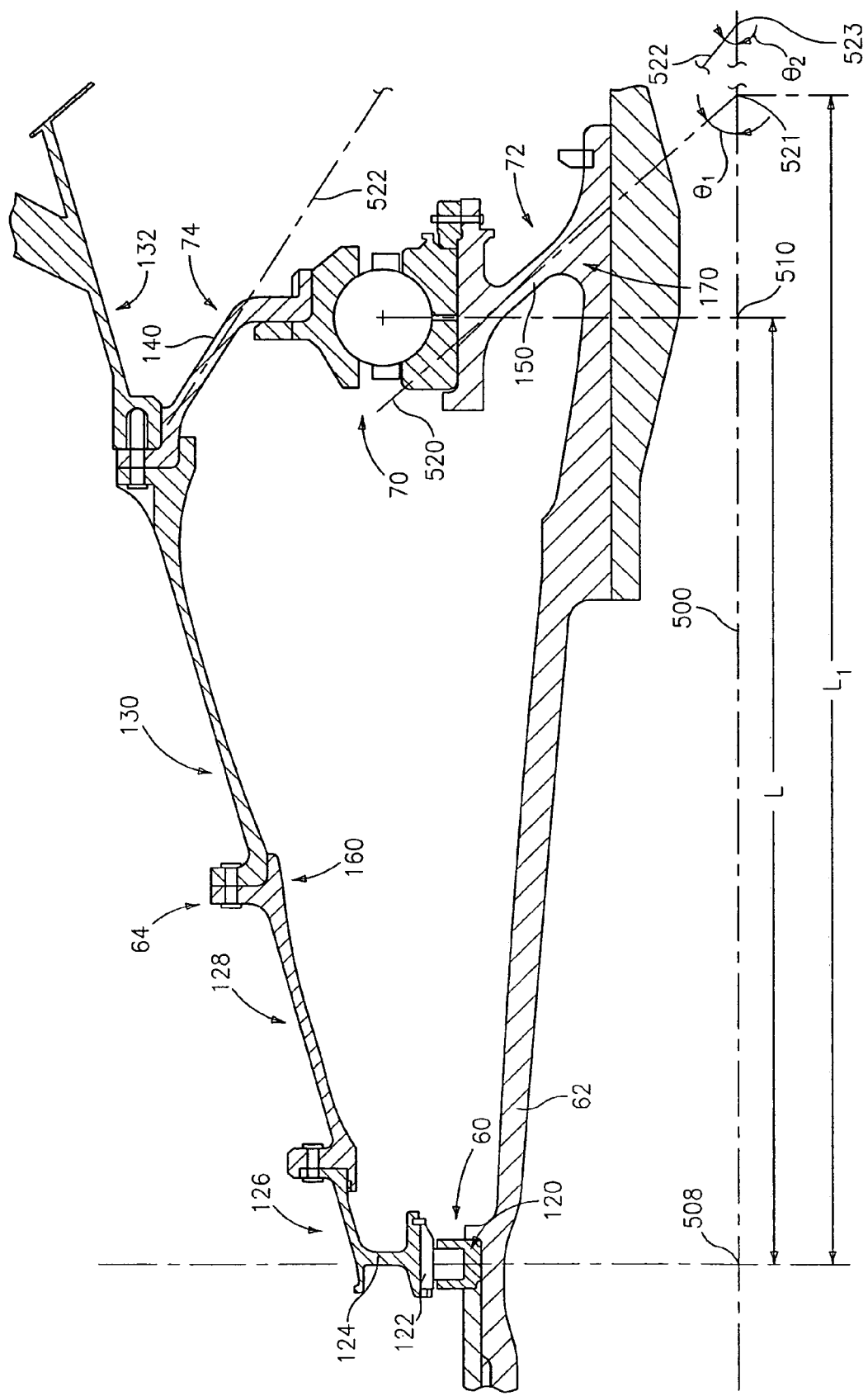
FIG. 2 is an enlarged view of two bearing systems of the engine of FIG. 1.

FIG. 2 shows further details of the number one and number two bearing systems 60 and 70. The exemplary number one bearing system is a roller bearing system having an inner race 120 on the low speed shaft assembly 62 and an outer race 122 supported by a radially-inward extending web portion 124 of a number one bearing support member 126 of the case assembly 64. The exemplary case assembly 64 includes the support 126 and fore and aft case members 128 and 130 bolted end-to-end at bolting flanges and having relatively thin, nearly frustoconical, webs extending between the flanges. The exemplary members 126, 128, and 130 may be formed as rings or annuli and may be segmented circumferentially, such segments bolted or otherwise secured together.

In the exemplary embodiment, the aftmost of these members 130 is secured at its aft flange to the front flange of a forwardly and inwardly extending portion 132 of the strut hub 32. In the exemplary embodiment, an outer flange of the number two bearing outboard support 74 is secured between such aft and front flanges. An inner flange of the support 74 is secured to the outer race of the number two bearing 70. The support 74 has a central, substantially frustoconical, portion 140 having an approximate thickness and an approximate length (the approximation associated with radiusing and other departures from an even thickness frustoconical form such as for manufacturability). The exemplary number two bearing inboard support 72 is unitarily formed with one of the structural pieces of the low speed spool shaft assembly 62. The support 72 has a root 170. Extending radially outward and forward from a remaining portion of that piece, the support 72 has a central, substantially frustoconical, portion 150 having an approximate thickness and an approximate length. The central portion 150 transitions to an outboard portion secured to the inner race of the number two bearing 70.

In the exemplary embodiment, there is a length L between the centers 508 and 510 of the number one and number two bearings, respectively. In normal true-running operation, these centers fall at intersections of the centerline 500 with transverse radial planes centrally through the bearings. FIG. 2 further shows a virtual cone 520 essentially defined by the central portion 150 of the flange 72. The exemplary cone 520 may represent a median of such portion. The cone 520 has a vertex 521 along the centerline 500. The central portion 140 of the support 74 similarly defines a virtual cone 522 having a vertex 523. The cones 520 and 522 have half angles $\theta_1$ and $\theta_2$.

Figure 3:
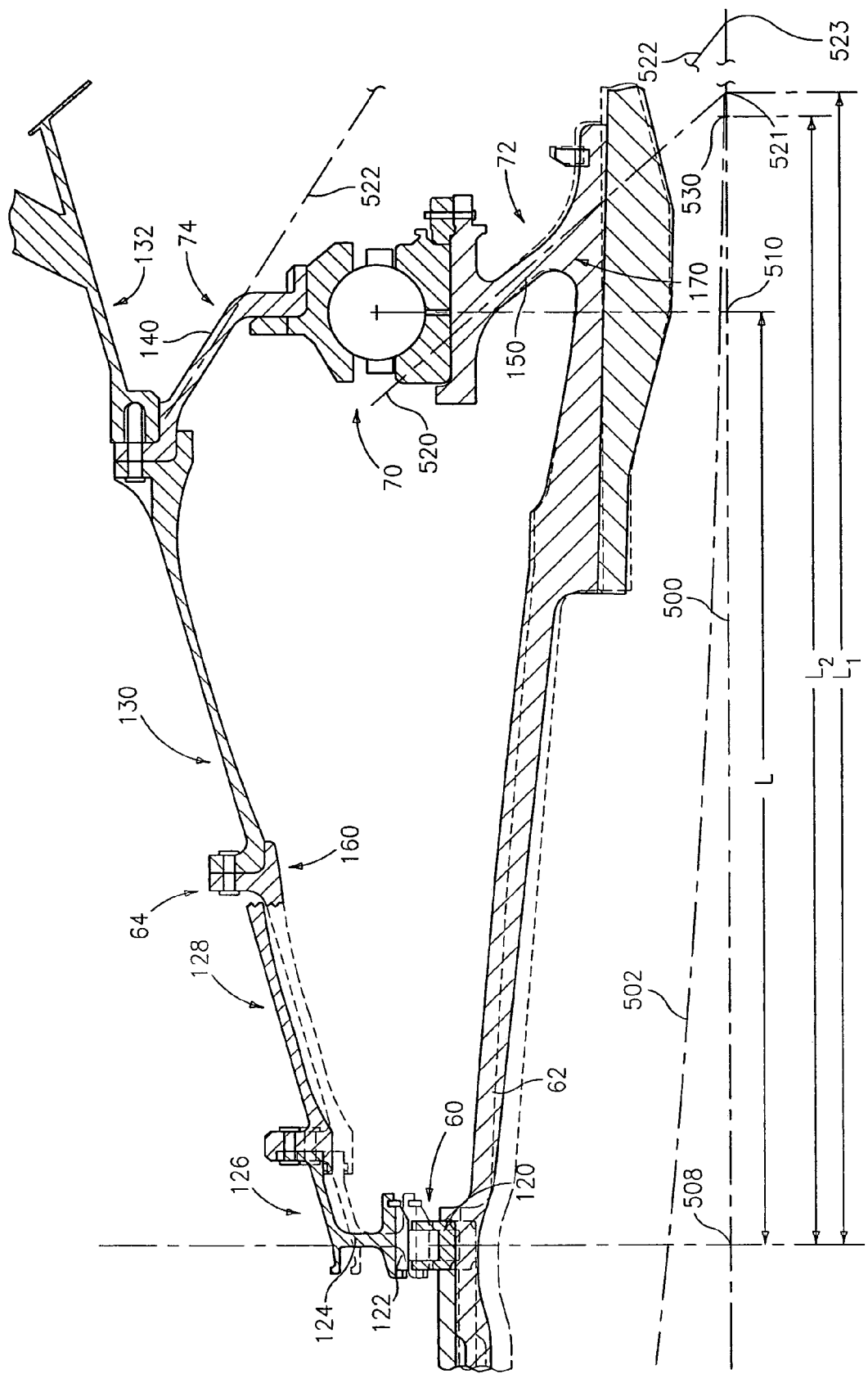
FIG. 3 is a view of the bearing systems of FIG. 2 with the engine in an FBO imbalanced condition.

In operation, imbalance due to an FBO condition initially places very high stress on the case assembly 64 due to dynamic forces being transmitted between the number one bearing 60 and the strut hub 32. A fusible link may be provided in the force path between the number one bearing and strut hub so as to define a predetermined rupture location for an imbalance force above a threshold. In the exemplary embodiment, the fusible link may be associated with one of the junctions between the case assembly members. FIG. 3 shows an exemplary fusible link near the junction 160 between the aft flange of the fore member 128 and the fore flange of the aft member 130. A fusing or rupturing may be by rupturing of the bolts, one of the members (e.g., shown in FIG. 3), an intermediate structure, or the like. With the rupture, the shaft assembly may radially shift, displacing a shaft centerline 502 from the engine centerline 500 (an undeflected position shown in broken lines).

Fusing of the number one bearing support cantilevers a forward portion of the shaft. Displacement of the imbalanced rotor is due to the radial imbalance force acting principally in the direction of the rotor imbalance, producing a combination of radial displacements associated with the shaft 62, the central portion of the shaft bearing support 150, and the bearing outboard support 74. This is due to shaft bending and bearing support displacement. FIG. 3 shows an exemplary condition during spooldown after the second transient response. With a hypothetical inflexible radial second bearing support, the now-free first bearing would be cantilevered by the length L. The angled support 72, however, increases this effective length to $L_2$ extending aft to a new effective support point 530 aft of the center 510 and potentially close to the original vertex 521. The actual location of the effective support point 530 will depend on the angles $\theta_1$ and $\theta_2$ and the thicknesses and lengths of the supports 72 and 74 and their central portions as well as associated material properties.

The increase in $L_2$ over L provides increased isolation of the imbalance by lowering the natural frequency of the system without, necessarily, increasing the actual length L relative to a base configuration. The rearward convergence of the number two bearing frustoconical supports tend to increase $L_2$, while changes in angle, thickness, and length determine the degree of contributing deflection components, and thus the final virtual $L_2$ distance obtained. Final geometry is also subject to integrity considerations. When a radial load is applied, such as occurs in a blade-off condition, each support 72 and 74 experiences two components of elastic deflection which work together to reduce the support stiffness, and thus increase the virtual distance $L_2$. The first component or reaction is the simple radial centerline deflection component due to the purely radial stiffness of the support. Because the bearing support is not purely radial in orientation, but rather frustoconical, the bearing support will also produce a second deflection response by producing a change in perpendicularity of the loaded end of the bearing support (normally 90°) relative to the engine centerline. These two responses occur simultaneously. Although the radial component of the deflection is always in the direction of loading, the slope-induced component of deflection by the radial loading of a frustoconical support can be additive or canceling to overall deflection depending upon the directionality of the cone, with a rearwardly converging support producing a canceling effect and a forwardly converging support (not shown) producing an additive effect. To soften and thus further isolate the rotating imbalance, the radial and slope deflection components of the support should be additive, and thus appear to the shaft as a softer support with the result being a virtual increase in distance $L_2$. The central portions 140 and 150 (and associated cones) are advantageously oriented to enhance virtual distance $L_2$ by about 10% over L (e.g., at least 5% and likely not more than 20% due to structural integrity considerations).

One or more embodiments of the present invention have been described. Nevertheless, it will be understood that various modifications may be made without departing from the spirit and scope of the invention. For example, the principles of the invention may be implemented in a wide variety of turbomachine and engine configurations. Various aspects of various components may be combined and various components may be separated further. The principles may be applied in both reengineering of existent turbomachines and in clean-sheet redesigns. In the former, details of the existing configuration may dictate or influence details of any particular implementation. Accordingly, other embodiments are within the scope of the following claims.

What is claimed is:

1. A turbine engine comprising:
   a first spool;
   support structure; and
   a plurality of bearing systems coupling the first spool to the support structure, including:
      a first bearing system having an inner race coupled to a shaft of the first spool and an outer race coupled to the support structure; and
      a second bearing system aft of the first bearing system and having an inner race coupled to the shaft of the first spool and an outer race coupled to the support structure, the first spool shaft having a main body portion and forwardly diverging web having a proximal root at the main body portion and a distal portion holding the second bearing system inner race.

2. The turbine engine of claim 1 wherein:
   an engine case duct portion of the support structure is coupled to the outer races of the first and second bearing systems by a forwardly and inwardly-extending structure having:
      an aft portion coupling the outer race of the second bearing system to the engine case duct portion; and
      a fore portion fusibly coupling the outer race of the first bearing system to the aft portion.

3. The turbine engine of claim 2 wherein said aft portion couples the outer race of the second bearing system to the engine case duct portion by:
   a rearwardly converging web having a proximal root at the aft body portion and a distal portion holding the second bearing system outer race.

4. The turbine engine of claim 1 wherein:
   the first bearing system is a frontmost of said plurality of bearing systems; and
   the second bearing system is a next aft of said plurality of bearing systems.

5. The turbine engine of claim 1 wherein:
   the forwardly diverging web is essentially a frustoconical sleeve.

6. The turbine engine of claim 5 wherein:
   the forwardly diverging web is unitarily formed with the main body portion of the shaft.

7. The turbine engine of claim 1 wherein:
   the web provides an effective post-fusing cantilever length in excess of an actual length between the first and second bearing systems.

8. The turbine engine of claim 7 wherein:
   said effective post-fusing cantilever length is in excess of 110% of said actual length.

9. A turbine engine comprising:
   a high spool;
   a low spool;
   a non-rotating structure; and
   a plurality of bearing systems coupling a first spool of high and low spools to the non-rotating structure and, including:
      a first bearing system having an inner race coupled to a shaft of the first spool and an outer race coupled to the non-rotating structure by a fusible coupling; and
      a second bearing system aft of the first bearing system by a first length and having an outer race coupled to the non-rotating structure and an inner race coupled to the shaft of the first spool by means for providing a post-fusing effective cantilever length of the first bearing system relative to the second bearing system in excess of the first length.

10. The turbine engine of claim 9 wherein:
    the first spool shaft has a main body portion; and
    the means comprises a forwardly diverging web having a proximal root at the main body portion and a distal portion holding the second bearing system inner race.

11. The turbine engine of claim 9 wherein the first spool is the high spool.

12. The turbine engine of claim 9 being a turbofan engine having a fan directly or indirectly coupled to the low spool.

* * * * *